T. SHARTS.
Self-Acting Switch for Street-Railroads.

No. 216,978. Patented July 1, 1879.

Attest:
John E. Phelps
Charles Traub

Inventor:
Theodore Sharts.

UNITED STATES PATENT OFFICE.

THEODORE SHARTS, OF NEW YORK, N. Y.

IMPROVEMENT IN SELF-ACTING SWITCHES FOR STREET-RAILROADS.

Specification forming part of Letters Patent No. 216,978, dated July 1, 1879; application filed December 26, 1878.

*To all whom it may concern:*

Be it known that I, THEODORE SHARTS, of the city, county, and State of New York, have invented a new and useful Improvement in Self-Acting Switches for Street-Railroads, of which the following is a specification.

Figure 1:
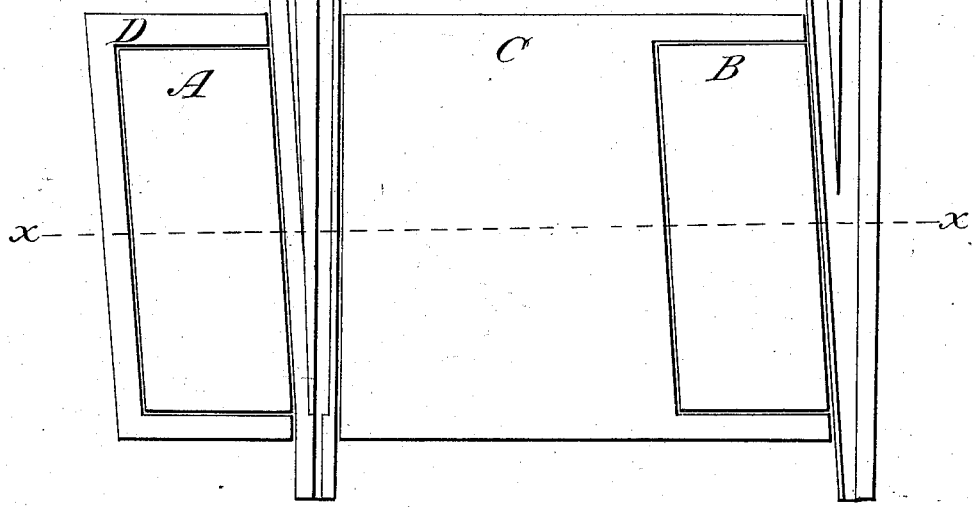
Figure 2:
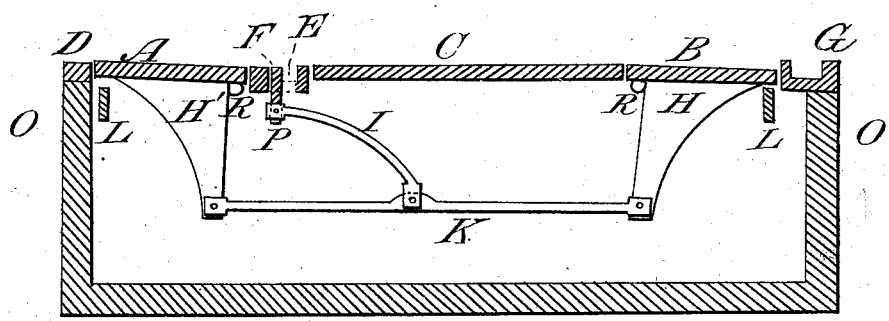

Figure 1 is a top view of my improved switch. Fig. 2 is a vertical cross-section of the same, taken through the line $x\ x$, Fig. 1.

Similar letters of reference indicate corresponding parts.

This invention is intended for street or horse railroads; and consists in the use of two tilting or depressed platforms, which are connected by machinery underneath to each other and to the tongue of the switch, so that the weight of the draft-animal of the car will depress the platforms as required and move the tongue of the switch to the desired position.

Heretofore this class of switches has been constructed as follows: some with a single oscillating platform located between the tracks, with an arm pendent from the center of the platform and a connecting-rod between said arm and the tongue of the switch. The platform, being so evenly balanced, is liable to rebound by the sudden stop of the animal upon it, and thus neutralize its proper action. Besides, the connecting-rod has a tendency to lift the tongue from the bed-plate of the switch rather than move it laterally, particularly so when the connections become corroded or choked with dirt. Others have two platforms placed in various positions inside and outside the tracks, some being depressed by the weight of the animals upon them, and others again resting upon rollers and moving backward and forward by the action of the animals walking over them. These are all operated by more or less complicated machinery, much of which is superfluous and liable to get out of order, and in some cases impracticable.

The machinery of my switch is the most simple, effectual in its position, and direct in its action of any yet desired, with just sufficient friction of its working parts to retain the platforms in their required position.

I prefer to place the platforms one inside and one outside the tracks, for the reason that no hauling of the animals from their direct line of travel is required for the straight or main track, as the inside platform lies directly in their path, so they cannot avoid stepping upon and depressing it, thus moving the tongue into position for the straight track. When it is required to run the car upon the turn-out or side track, the animal near that side should be guided to tread upon the outside platform, which will then be depressed and move the tongue into position for the side track.

In the drawings, A and B represent the movable platforms, placed over a pit or lever chamber, the walls of which may be constructed of iron, wood, brick, or other material. C represents a stationary platform or bridge over said pit; D, the frame around platform A; E, the switch-plate; F, the tongue; G, the side or dumb plate. H H' represent arms cast upon the lower side of the movable platforms; I, the connecting-rod between the swinging bar K and the projection P, attached to the bottom of the tongue F. R R represent journals upon which the platforms A and B vibrate. L L are stops or bearings upon which the platforms rest when in a downward position.

When the car approaches the straight track the animal will tread upon the movable platform B, which, as it is depressed by the weight of the animal, will cause the arm H, which is connected to the swinging bar K, to move the arm H' and raise the platform A; and by the same action the connecting-rod I will move laterally the projection P and cause the tongue F to assume the position as shown in Fig. 1. The reverse action will take place when the platform A is depressed.

Having thus described my invention, what I claim as new, and desire to secure by Letters Patent, is—

In a self-acting switch for street-railroads, the switch-tongue F, movable platforms A B, arms H H', swinging bar K, and connecting-rod I, arranged and operated substantially as and for the purpose specified.

THEODORE SHARTS.

Witnesses:
JOHN E. PHELP,
CHARLES TRAUB.